United States Patent [19]

Waugh

[11] 3,827,699

[45] Aug. 6, 1974

[54] HEAD CLEANER FOR CASSETTE TAPES

[75] Inventor: Jerry Waugh, Lomita, Calif.

[73] Assignee: P. R. Mallory & Co., Inc., Indianapolis, Ind.

[22] Filed: Dec. 7, 1972

[21] Appl. No.: 312,804

[52] U.S. Cl. .................. 274/47, 15/210 R, 117/235

[51] Int. Cl. .................. G11b 5/40

[58] Field of Search .................. 274/47; 15/210; 179/100.2 A

[56] References Cited

UNITED STATES PATENTS 3,069,815 12/1962 Valentine .................. 274/47 X 3,630,910 12/1971 Akashi et al. .................. 117/235 X 3,687,725 8/1972 Hartmann et al. .................. 117/235

*Primary Examiner*—Louis R. Prince

*Assistant Examiner*—Charles E. Phillips

*Attorney, Agent, or Firm*—Charles W. Hoffman; Robert F. Meyer

[57] ABSTRACT

A cleaning leader for magnetic tapes comprising a plastic substrate and a non-abrasive coating having unoriented metal oxide particles dispersed through a binder, providing high and low spots on a surface of the coating.

12 Claims, 3 Drawing Figures

PATENTED AUG 6 1974 3,827,699

HEAD CLEANER FOR CASSETTE TAPES

This invention relates to tapes for use in information sensing apparatus, and more particularly to a cleaning tape for use in cleaning components of such apparatus. The article of this invention has particular utility in sensing apparatus employing magnetic tapes and will be described as embodied in such apparatus.

In the operation of information sensing apparatus, such as cassetts using magnetic tapes, it has been necessary to clean the magnetic head which senses the information on the tape. Frequent cleaning is necessary principally due to the fact that during usage, loose particles of the magnetic tape collect on the various components of the apparatus, including the sensing head. Such loose particles causes errors in the information sensing process and also causes wear on the tape passing over the sensing head.

One prior art manner of cleaning such apparatus usually involves a certain amount of dismantling of the apparatus for the manual application of a brush and a cleaning solvent. This method is obviously very time consuming and costly.

Of recent years cleaning leaders for the tape have been developed. More specifically the lead portion of the tape is fabricated from a material which facilitates cleaning of the components of the apparatus such as the sensing head. The present invention is directed to such a cleaning leader having improved cleaning properties.

Accordingly, it is an object of this invention to provide an elongated tape for use with information sensing apparatus, the tape having a cleaning portion for cleaning the various components of the apparatus.

Another object of the invention is the provision of an elongated tape for use with information sensing apparatus having an information bearing section and a cleaning section connected in series with the information bearing section.

Still another object of the invention is the provision of an elongated tape for use with information sensing apparatus having a cleaning section comprising a plastic substrate and a non-abrasive coating having unoriented metal-oxide particles dispersed throughout a binder, the particles providing high and low spots on the surface of the coating.

And another object of the invention is the provision of an elongated magnetic tape for use in information sensing apparatus having a cleaning section composed of a polyester substrate and a coating thereon, the coating being comprised of a polyurethane binder, with titanium dioxide particles dispersed throughout the binder.

These and other objects of the invention will become apparent from the following description taken in conjunction with the accompanying drawings wherein.

Generally speaking, the objects of the invention are accomplished by providing an elongated tape for use with information sensing apparatus comprising an information bearing section and a cleaning section connected in series with the information bearing section, the cleaning section comprising a plastic substrate with a non-abrasive coating thereon, the coating being comprised of unoriented metal-oxide particles dispersed throughout a binder, the particles providing high and low spots on the surface of the coating.

Figure 1:
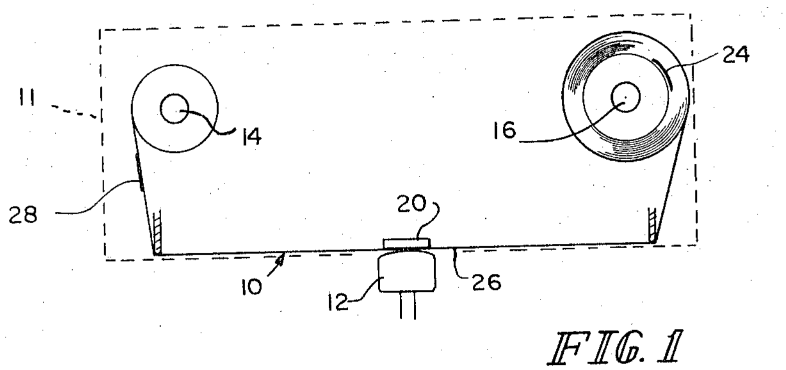
FIG. 1 is a diagramatic view showing an information bearing tape being moved past a sensing head.
Figure 2:
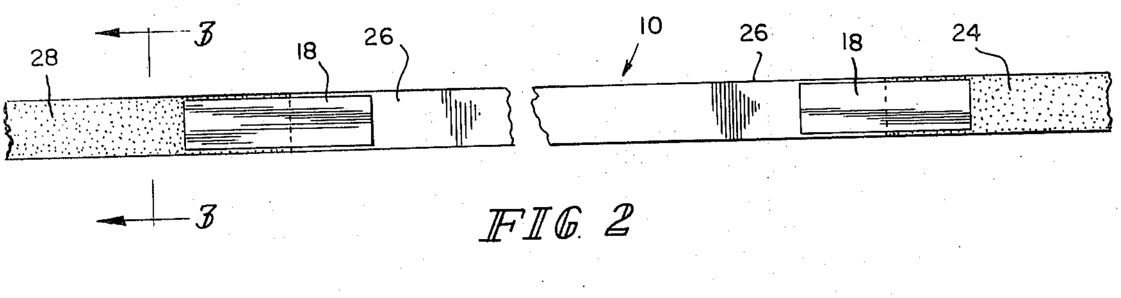
FIG. 2 is a plan view of the tape in accordance with the invention.

Referring now to the drawings, a magnetic tape indicated at 10 is shown being moved by a suitable driving mechanism in a cassette 11 over a magnetic sensing head 12. The driving mechanism includes reels 14 and 16, and pressure pad 20. Tape 10 is more clearly shown in FIG. 2 as being comprised of three sections: a leading portion 24, an information bearing section 26, and a trailing portion 28. In accordance with the present invention, either of the leading portions 24 or trailing portion 28, or both, is comprised of a cleaning material which will effectively clean the various components of the information sensing apparatus, particularly the sensing head 12. Both leading and trailing portions may be attached to the information bearing section 26 by some suitable means such as an overlapping adhesive tape 18.

Figure 3:
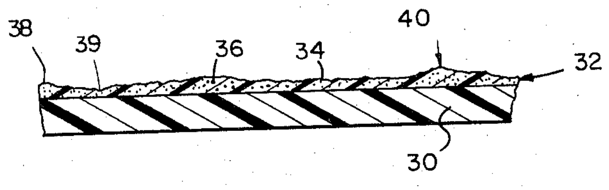
FIG. 3 is a cross-section of the tape taken along the line 3—3 of FIG. 2.

With particular reference to FIG. 3 it is seen that the cleaning portions of the tape includes a substrate 30 provided with a coating 32 bonded thereto. Substrate 30 may be formed from a suitable plastic material such as a polyester. Coating 32 comprises a binder 34 having unoriented particles 36 of a metal oxide dispersed throughout the binder. The unoriented particles provide high and low spots 38 and 39 respectively on surface 40 of the coating.

A suitable material for the binder 34 would be polyurathane, for example. Particles 34 are a metal oxide and in the particular embodiment of the invention disclosed the particles are titanium dioxide. The particular coating is non-abrasive so as to not promote head wear and is also non-magnetic such that it is not capable of producing recordings. The high and low spots on the surface tend to get in and behind dirt particles built up on the components of the apparatus and in particular the sensing head 12. Titanium dioxide particles are particularly useful because of their strength. The amount of titanium dioxide present in the coating is approximately from about 30 to about 80 percent by weight of the coating.

The length of the leading and trailing portions should be such that the operating life of the cleaning tape substantially equals the operative life of the information bearing section of the tape.

The coating may be applied to the substrate by forming a mix of the titanium dioxide particles and the polyurathane, along with other necessary solvents, the mix then being applied to the substrate through pressure rolling.

What is claimed is:

1. An elongated tape for use with information sensing apparatus and the like comprising an information bearing section and a cleaning section connected in series with said information bearing section, said cleaning section comprising a polyester substrate and a non-abrasive coating thereupon comprising unoriented titanium dioxide particles dispersed throughout a binder, said titanium dioxide particles providing high and low spots on a surface of said coating.

2. An elongated tape according to claim 1 wherein said cleaning section is at the lead end of said tape.

3. An elongated tape according to claim 1 wherein said cleaning section is at the trailing end of said tape.

4. An elongated tape according to claim 1 wherein said cleaning section is at both ends of said tape.

5. An elongated tape according to claim 1 wherein said binder is a polyurethane based binder.

6. An elongated tape according to claim 5 wherein said titanium dioxide is in an amount of from about 30 to 80 percent by weight of said coating.

7. A sensing head cleaning tape comprising:

a. a polyester substrate and b. a non-abrasive coating carried by said substrate comprising unoriented titanium dioxide particles dispersed throughout a binder, said titanium dioxide particles providing high and low spots on a surface of said coating.

8. A sensing head cleaning tape according to claim 7 wherein said binder is a polyurethane based binder.

9. A sensing head cleaning tape according to claim 8 wherein said titanium dioxide is in an amount of from about 30 to 80 percent by weight of said coating.

10. In a cassette wherein a magnetic tape having an information bearing section is passed over and in engagement with a sensing head, the improvement comprising:

providing a cleaning portion as part of said tape, said cleaning portion comprising a plastic substrate and a non-abrasive coating thereon having unoriented titanium dioxide particles dispersed throughout a binder, said titanium dioxide particles providing high and low spots on a surface of said coating.

11. In a cassette according to claim 10 wherein said substrate is a polyester and said binder is a polyurethane based binder.

12. In a cassette according to claim 11 wherein said titanium dioxide particles are in the amount of from about 30 to 80 percent by weight of said coating.

* * * * *